(No Model.)
B. F. FOWLER.
FRYING PAN OR SKILLET.
No. 482,630.  Patented Sept. 13, 1892.
Fig. 1.
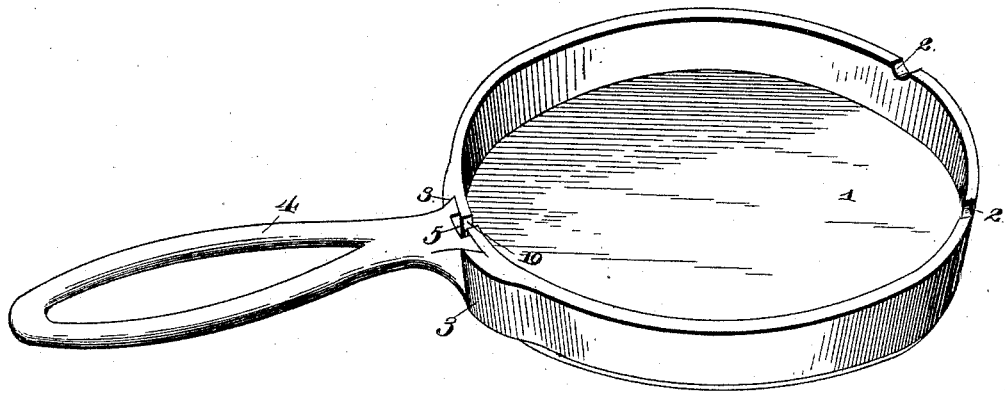
Fig. 2.
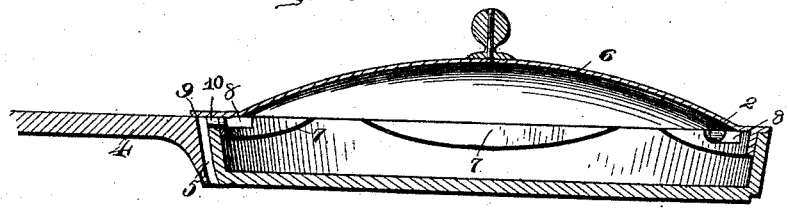
Fig. 3.
Fig. 4.
Fig. 5.
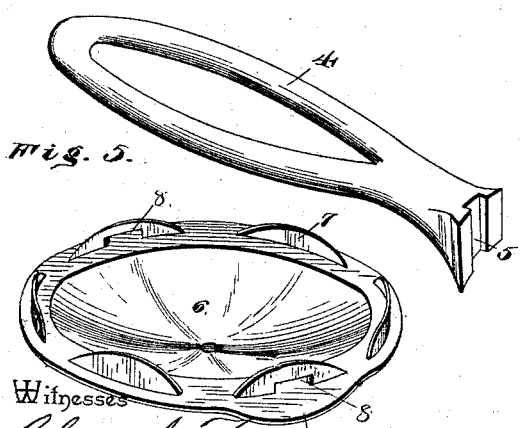
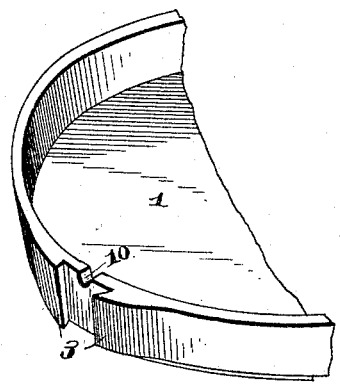
Witnesses  
Chas A. Ford  
N. J. Riley
Inventor  
Benjamin F. Fowler  
By his Attorneys,  
C. A. Snow & Co.

UNITED STATES PATENT OFFICE.

BENJAMIN F. FOWLER, OF MINNEAPOLIS, MINNESOTA, ASSIGNOR OF ONE-HALF TO CLARENCE R. WATERMAN, OF SAME PLACE.

FRYING-PAN OR SKILLET.

SPECIFICATION forming part of Letters Patent No. 482,630, dated September 13, 1892.

Application filed April 20, 1892. Serial No. 429,931. (No model.)

*To all whom it may concern:*

Be it known that I, BENJAMIN F. FOWLER, a citizen of the United States, residing at Minneapolis, in the county of Hennepin and State of Minnesota, have invented a new and useful Frying-Pan or Skillet, of which the following is a specification.

The invention relates to improvements in frying-pans or skillets.

The object of the present invention is to improve the construction of skillets and frying-pans and to render the same smokeless and to enable the steam and vapors arising from the contents to be conducted into the stove or to be condensed with the contents.

The invention consists in the construction and novel combination and arrangement of parts hereinafter fully described, illustrated in the accompanying drawings, and pointed out in the claims hereto appended.

In the drawings, Figure 1 is a perspective view of a frying-pan or skillet constructed in accordance with this invention, the cover being removed. Fig. 2 is a central vertical sectional view taken longitudinally of the handle, the cover being in place. Fig. 3 is a detail perspective view of the removable handle. Fig. 4 is a similar view of a portion of the body of the pan or skillet. Fig. 5 is a detail perspective view of the cover.

Like numerals of reference indicate like parts in all the figures of the drawings.

1 designates the body of the frying-pan or skillet, provided at its upper edge with notches 2 and having on its outer face vertically-disposed beveled flanges 3, forming a dovetailed groove or way adapted for the reception of the inner end of a removable handle 4. The removable handle 4 is provided at its inner end, which is beveled at opposite sides to fit into the dovetailed groove or way, with a vertical groove 5, forming a flue and extending from the top of the skillet or pan to the bottom thereof and designed to communicate at its lower end with the stove-opening, whereby the vapors and smoke and the like arising from the contents of the frying-pan or skillet will not be given off into a room, but will be conducted into the stove. The skillet or pan is provided with a removable cover 6, which extends over the upper end of the groove 5 and which is provided with depending curved flanges 7, which fit within the pan or skillet and secure the cover thereon. The draft to cause and force the steam and vapors into the flue or groove is caused and provided by means of the said notches or recesses 2, which form openings at the top of the frying-pan or skillet for the admission of air. The curved flanges 7 are provided with slots 8, which register with the recesses 2 and a recess 10, and the cover is provided with a flange 9, arranged over the upper end of the groove or flue, and by partially rotating the cover the slots are carried away from the recesses 2, and imperforate portions of the flanges close those notches. At the same time an imperforate portion of a flange is carried over the recess 10 or flue and closes the same. This closes the top of the pan or skillet, and any vapors arising from the contents are prevented from escaping and caused to condense with the contents.

It will be seen that the frying-pan or skillet is simple and comparatively inexpensive in construction and that the vapors and steam arising from the contents may be either conducted into the fire or caused to condense with the contents, as is desired.

What I claim is—

1. A pan or skillet comprising a body provided with notches at its upper edge, a removable handle provided at its inner end with a groove forming a flue and extending from the top of the pan to the bottom thereof, and a cover provided with curved flanges and having slots therein adapted to register with the notches and to close the same, substantially as described.

2. A pan or skillet comprising a body provided with notches at its upper edge and having beveled flanges arranged on its outer face and forming a dovetailed way, a detachable handle having its inner end beveled and adapted to fit in the dovetailed way and provided with a vertical groove extending from the top to the bottom of the pan, and a cover having curved flanges provided with slots to register with said notches and having a flange arranged to close the top of said groove, substantially as described.

In testimony that I claim the foregoing as my own I have hereto affixed my signature in the presence of two witnesses.

BENJAMIN F. FOWLER.

Witnesses:
 A. C. MIDDELSTADT,
 A. J. GOLDER.